(12) United States Patent
Matsumoto

(10) Patent No.: US 9,473,675 B2
(45) Date of Patent: Oct. 18, 2016

(54) COLOR CONVERSION PROCESSING APPARATUS, COLOR CONVERSION PROCESSING METHOD, AND NON-TRANSITORY STORAGE MEDIUM

(71) Applicant: FUJIFILM Corporation, Minato-ku, Tokyo (JP)

(72) Inventor: Hiroshi Matsumoto, Minato-ku (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 14/508,132

(22) Filed: Oct. 7, 2014

(65) Prior Publication Data

US 2015/0098099 A1  Apr. 9, 2015

(30) Foreign Application Priority Data

Oct. 8, 2013  (JP) ................................ 2013-210842

(51) Int. Cl.
| | |
|---|---|
| H04N 1/40 | (2006.01) |
| H04N 1/60 | (2006.01) |
| G01J 3/46 | (2006.01) |
| G01J 3/52 | (2006.01) |

(52) U.S. Cl.
CPC ............. *H04N 1/6008* (2013.01); *G01J 3/462* (2013.01); *G01J 3/524* (2013.01); *H04N 1/603* (2013.01); *H04N 1/6036* (2013.01); *G01J 2003/467* (2013.01)

(58) Field of Classification Search
CPC .. H04N 1/54; H04N 11/603; H04N 11/6033; H04N 11/6055; H04N 11/6058; H04N 11/6061; H04N 11/56; H04N 11/6008; G06K 15/025; G06K 15/1878; G01J 3/463
USPC ......... 358/1.9, 2.1, 500, 504, 515–521, 527, 358/406, 468; 382/162–167
See application file for complete search history.

(56) References Cited

U.S. PATENT DOCUMENTS

| | | | |
|---|---|---|---|
| 8,955,940 B1 * | 2/2015 | Smith et al. ............... | 347/15 |
| 2008/0043271 A1 * | 2/2008 | Gil et al. .................. | 358/1.9 |
| 2010/0149561 A1 * | 6/2010 | Nishide .................... | 358/1.9 |
| 2011/0063699 A1 * | 3/2011 | Ishizuka et al. .......... | 358/530 |
| 2011/0096330 A1 * | 4/2011 | Dalal et al. ............... | 356/402 |
| 2013/0335761 A1 * | 12/2013 | Koh et al. ................. | 358/1.9 |

FOREIGN PATENT DOCUMENTS

| | | |
|---|---|---|
| JP | 2006-279091 A | 10/2006 |
| JP | 2010-11048 A | 1/2010 |
| JP | 4803048 B2 | 10/2011 |

* cited by examiner

*Primary Examiner* — Thomas D Lee
*Assistant Examiner* — Stephen Brinich
(74) *Attorney, Agent, or Firm* — Sughrue Mion, PLLC

(57) ABSTRACT

A color conversion processing apparatus acquires spot color information, which is capable of defining a spot color with device-dependent color values. The color conversion processing apparatus further acquires a reference profile and an updated profile, and using the spot color information, converts an image signal of a spot color plate into a first image signal of a process color plate. Then, by having the reference profile and the updated profile act successively thereon, the color conversion processing apparatus converts the first image signal into a second image signal of a process color plate.

10 Claims, 7 Drawing Sheets

| COLOR PATCH | COLOR | L* | a* | b* |
|---|---|---|---|---|
| 36a | Paper | 93 | 0 | −3 |
| 36b | K | 16 | 0 | 0 |
| 36c | C | 54 | −36 | −49 |
| 36d | M | 46 | 72 | −5 |
| 36e | Y | 88 | −6 | 90 |
| 36f | M+Y | 47 | 66 | 50 |
| 36g | C+Y | 49 | −66 | 33 |
| 36h | C+M | 20 | 25 | −48 |
| 36i | C+M+Y | 18 | 3 | 0 |

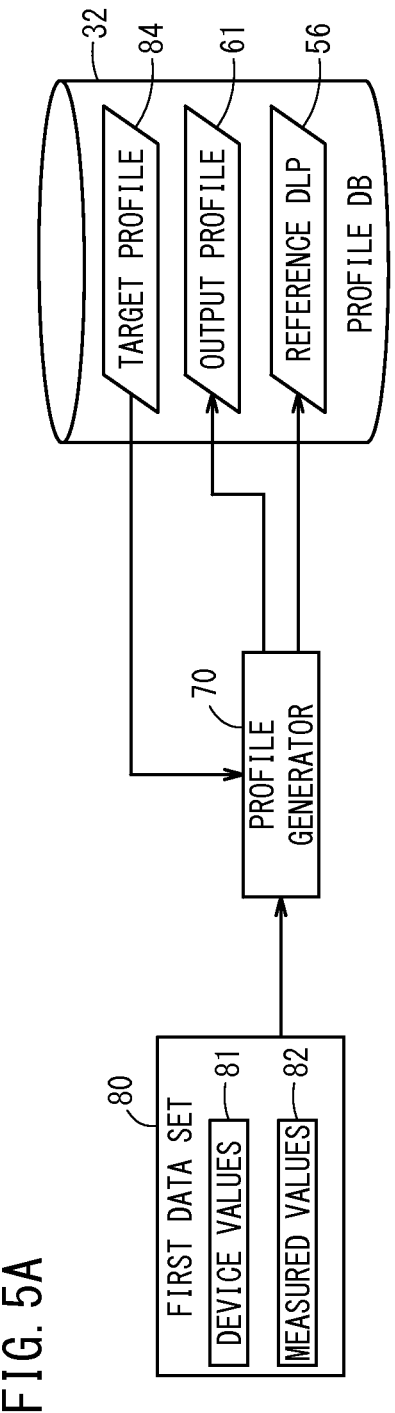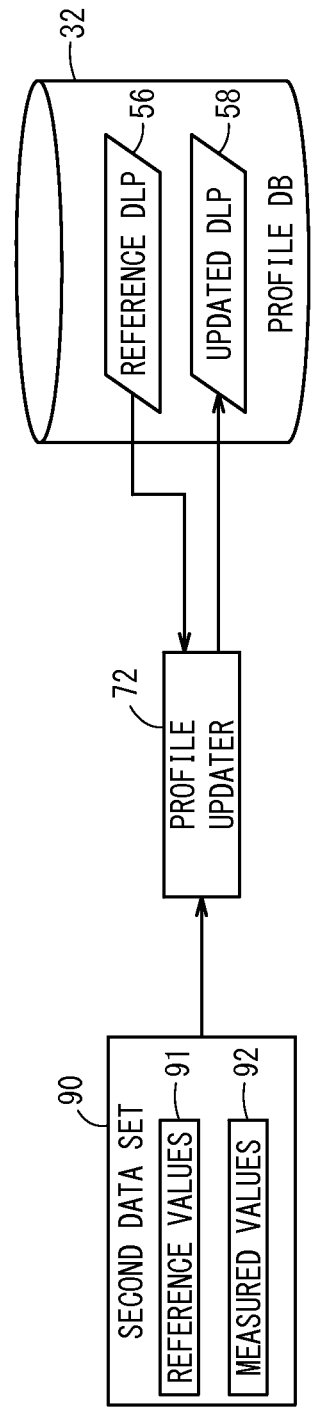

COLOR CONVERSION PROCESSING APPARATUS, COLOR CONVERSION PROCESSING METHOD, AND NON-TRANSITORY STORAGE MEDIUM

CROSS-REFERENCE TO RELATED APPLICATION

This application is based upon and claims the benefit of priority from Japanese Patent Application No. 2013-210842 filed on Oct. 8, 2013, the contents of which are incorporated herein by reference.

BACKGROUND OF THE INVENTION

1. Field of the Invention

The present invention relates to a color conversion processing apparatus and a color conversion processing method for converting input image signals, which are composed of image signals of process color plates and an image signal of a spot color plate, into output image signals of process color plates. The present invention also relates to a non-transitory storage medium that stores a program for performing such an image signal conversion.

2. Description of the Related Art

Heretofore, it has occasionally been practiced in the printing field to print a color image based on image signals of color plates in C, M, Y, K (hereinafter referred to as "process color plates") and a color plate in a spot color (hereinafter referred to as a "spot color plate"). In this case, on condition a printing press that is unable to perform spot color printing is used to print the color image, then since the printing press is incompatible with the image signals, it is necessary to convert input image signals, which are made up of process color plates and a spot color plate, into output image signals made up of process color plates.

Generally, information concerning a spot color (hereinafter referred to as "spot color information") is stored in association with the type of output profile that is suitable for a printing press. Therefore, since the output profile is updated in a case where an output device is calibrated, the output profile is changed from the inherent definition of the spot color, thereby resulting in a reduction in the reproduction accuracy of the spot color. In view of this problem, various processes have been proposed for achieving consistency between spot color information and output profiles.

Japanese Patent No. 4803048 discloses an apparatus, etc., in which, on condition it is judged that an output profile (color conversion table) is changed, the device-dependent value of a spot color also is changed based on the color conversion table.

Japanese Laid-Open Patent Publication No. 2010-011048 reveals an apparatus, which converts device-dependent color values on a reference medium into device-dependent color values on a new medium, using output profiles on the reference medium and the new medium.

SUMMARY OF THE INVENTION

According to the apparatus, etc., disclosed in Japanese Patent No. 4803048 and Japanese Laid-Open Patent Publication No. 2010-011048, however, each time that an output profile is updated, all of the spot color information needs to be updated as a whole, after having referred to each spot color information item that is related to the output profile. Therefore, management of data has been quite tedious and time-consuming.

The present invention has been made with a view toward solving the above problems. It is an object of the present invention to provide a color conversion processing apparatus, a color conversion processing method, and a non-transitory storage medium, which are capable of maintaining the reproduction accuracy of a spot color while data management is easily performed on the spot color information.

According to the present invention, a color conversion processing apparatus is provided for converting input image signals, which include image signals of process color plates and an image signal of a spot color plate, into output image signals of process color plates. The color conversion processing apparatus comprises a spot color information acquirer configured to acquire spot color information, which is capable of defining a spot color with device-dependent color values, a profile acquirer configured to acquire a reference profile representing a device link profile at a reference time at which the spot color is defined, and an updated profile, which is defined by the reference profile updated after the reference time, a first color converter configured to convert the image signal of the spot color plate into a first image signal of a process color plate, using the spot color information acquired by the spot color information acquirer, and a second color converter configured to convert the first image signal, which has been converted by the first color converter, into a second image signal of a process color plate by having the reference profile and the updated profile, which are acquired by the profile acquirer, act successively thereon.

The first color converter uses the spot color information. The second color converter does not use the spot color information, but has the reference profile and the updated profile act successively on the first image signal. Moreover, the first color converter and the second color converter are separate from each other. Consequently, updated results of profiles can appropriately be reflected even though the same spot color information is used. Thus, the color reproduction accuracy of the spot colors can be maintained while data management is easily performed on the spot color information.

The color conversion processing apparatus preferably further comprises a process color converter configured to convert the image signals of the process color plates into third image signals of process color plates, by having the updated profile act thereon, and a signal adder configured to add the second image signal, which has been converted by the second color converter, to the third image signals, which have been converted by the process color converter, in order to obtain the output image signals.

The spot color information acquirer preferably acquires as the spot color information device-independent color values of the spot color and an output profile which is used in generating the reference profile. Alternatively, the spot color information acquirer preferably acquires as the spot color information device-dependent color values of the spot color.

According to the present invention, there also is provided a color conversion processing method for converting input image signals, which include image signals of process color plates and an image signal of a spot color plate, into output image signals of process color plates, the color conversion processing method enabling a computer to perform the steps of acquiring spot color information, which is capable of defining a spot color with device-dependent color values, acquiring a reference profile representing a device link profile at a reference time at which the spot color is defined, and an updated profile, which is defined by the reference profile updated after the reference time, converting the image signal of the spot color plate into a first image signal of a process color plate, using the acquired spot color information, and converting the converted first image signal into a second image signal of a process color plate by having the acquired reference profile and the acquired updated profile act successively thereon.

According to the present invention, there further is provided a non-transitory storage medium storing a color conversion processing program for converting input image signals, which include image signals of process color plates and an image signal of a spot color plate, into output image signals of process color plates, the color conversion processing program enabling a computer to perform the steps of acquiring spot color information, which is capable of defining a spot color with device-dependent color values, acquiring a reference profile representing a device link profile at a reference time at which the spot color is defined, and an updated profile, which is defined by the reference profile updated after the reference time, converting the image signal of the spot color plate into a first image signal of a process color plate, using the acquired spot color information, and converting the converted first image signal into a second image signal of a process color plate by having the acquired reference profile and the acquired updated profile act successively thereon.

With the color conversion processing apparatus, the color conversion processing method, and the non-transitory storage medium according to the present invention, a first color conversion process uses the spot color information, and a second color conversion process does not use the spot color information but has the reference profile and the updated profile act successively on the first image signal. Moreover, the first color conversion process and the second color conversion process are separate from each other. Consequently, updated results of profiles can appropriately be reflected, even though the same spot color information is used. Thus, the color reproduction accuracy of the spot colors can be maintained while data management is easily performed on the spot color information.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 5A is a schematic block diagram showing a data process flow of a profile generator shown in FIG. 3;

FIG. 5B is a schematic block diagram showing a data process flow of a profile updater shown in FIG. 3;

DESCRIPTION OF THE PREFERRED EMBODIMENTS

A color conversion processing method according to a preferred embodiment of the present invention, in relation to a color conversion processing apparatus and a non-transitory storage medium that stores a color conversion processing program for carrying out the color conversion processing method, will be described in detail below with reference to the accompanying drawings.

[Overall Configuration of Print Production System 10]

Figure 1:
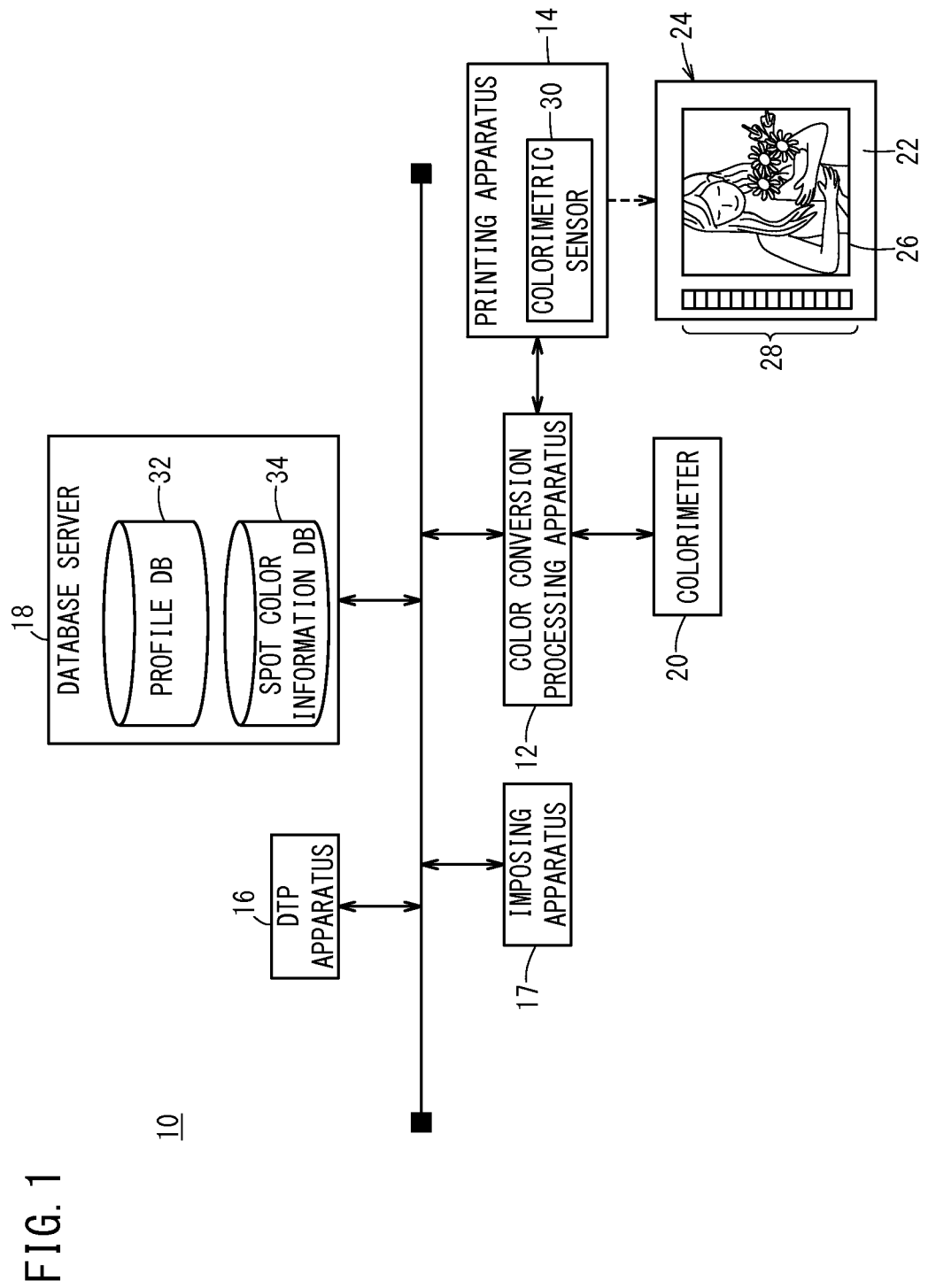
FIG. 1 is an overall block diagram of a print production system incorporating a color conversion processing apparatus according to an embodiment of the present invention.

FIG. 1 is an overall block diagram of a print production system 10 incorporating a color conversion processing apparatus 12 according to an embodiment of the present invention.

As shown in FIG. 1, the print production system 10 basically includes, in addition to the color conversion processing apparatus 12, a printing apparatus 14, a DTP (Desk-Top Publishing) apparatus 16, an imposing apparatus 17, and a database server 18. The color conversion processing apparatus 12, the DTP apparatus 16, the imposing apparatus 17, and the database server 18 are electrically connected to each other through a wired or wireless link.

The color conversion processing apparatus 12 converts image signals input from an external apparatus (hereinafter referred to as "input image signals") into image signals suitable for printing by the printing apparatus 14 (hereinafter referred to as "output image signals"). The color conversion processing apparatus 12 outputs the converted image signals as output data to the printing apparatus 14. The input image signals are composed of image signals representing process color plates and a spot color plate. The process color plates imply four color plates (C, M, Y, K) or three color plates (C, M, Y), whereas the spot color plate implies a color plate (e.g., green or violet) that differs from the process colors.

A colorimeter 20 for measuring color values of an object to be measured is connected to the color conversion processing apparatus 12. The color values include not only tristimulus values X, Y, Z, coordinate values $L^*$, $a^*$, $b^*$ of a uniform color space, or the like, but also include characteristics of optical physical values with respect to wavelengths, e.g., a spectral radiation distribution, a spectral sensitivity distribution, a spectral reflectance, or a spectral transmittance. The color values, which are acquired by the colorimeter 20, may hereinafter be referred to as "colorimetric values".

The printing apparatus 14 is connected electrically to the color conversion processing apparatus 12 through a serial interface such as a USB (Universal Serial Bus) cable, an IEEE1394 cable, an Ethernet (registered trademark) cable, a wireless network, or the like, or a parallel interface such as a Centronics cable.

Based on output data supplied from the color conversion processing apparatus 12, the printing apparatus 14 produces a print 24 comprising a print medium 22 with an image formed thereon. The print medium 22 may comprise a paper medium such as synthetic paper, thick paper, aluminum-evaporated paper, or the like, a resin medium such as vinyl chloride, PET (polyethylene terephthalate), or the like, or tarpaulin paper, metal sheeting, or the like.

On condition the printing apparatus 14 comprises a proofer, then the printing apparatus 14 may comprise a DDCP (Direct Digital Color Proofer), an ink jet color proofer, a low-resolution color laser printer (electrophotographic printer), an ink jet printer, or the like.

On condition the printing apparatus 14 comprises a letterpress, then the printing apparatus 14 applies inks to the print medium 22 through printing plates and intermediate transfer members, not shown, thereby producing the print 24 with an image on the print medium 22.

On condition the printing apparatus 14 comprises a digital printer, then the printing apparatus 14 can produce the print 24 directly without the intermediary of printing plates. The digital printer may comprise an ink jet printer, a wide-format printer, an ink jet color proofer, a color laser printer, or the like.

The print 24 that has been produced by the printing apparatus 14 includes at least a finished area 26, which remains as an actual image area after marginal edge areas are cropped, and a control strip 28, which is disposed in one of the marginal edge areas to be cropped.

The printing apparatus 14 includes a colorimetric sensor 30 for measuring color values of an object to be measured. The colorimetric sensor 30 has a detection surface, not shown, which faces toward an image forming surface (where the finished area 26 is present) of the print medium 22. The printing apparatus 14 with the colorimetric sensor 30 is capable of colorimetrically measuring colors of an image, e.g., the control strip 28, which is formed on the print medium 22, as the print medium 22 is being transported through the printing apparatus 14 by a non-illustrated transporting mechanism. Alternatively, the printing apparatus 14 may be free of the colorimetric sensor 30, and the colors of the image may be measured colorimetrically by the colorimeter 20.

The DTP apparatus 16 is an apparatus for performing a preflight process on content data made up of characters, figures, pictures, photographs, etc., and generating data of each page (page data) from the content data. The imposing apparatus 17 is an apparatus for performing an imposing process depending on a designated binding process or a sheet folding process, while referring to tag information of a job ticket, e.g., a JDF (Job Definition Format) file.

The database server 18 is a server apparatus for storing various data with respect to work flows. For example, the database server 18 may store content data, output data (e.g., platemaking data, printing plate data, or proofreading data), job tickets, e.g., JDF (Job Definition Format) files, color profiles, and spot color information, etc.

As shown in FIG. 1, the database server 18 includes a database of color profiles (referred to simply as "profiles") (hereinafter referred to as a "profile DB 32") and a database of spot color information (hereinafter referred to as a "spot color information DB 34").

[Layout of Print 24]

Figures 2A, 2B:
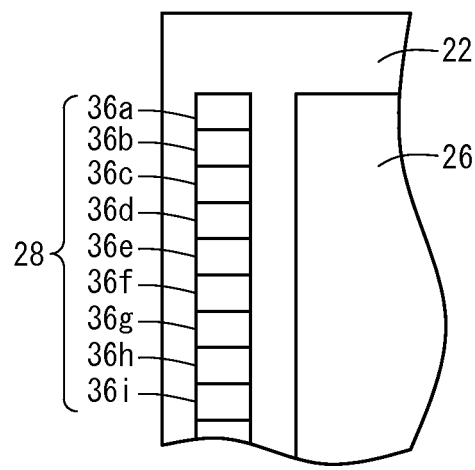
FIG. 2A is an enlarged fragmentary view of a print shown in FIG. 1.
FIG. 2B is a diagram showing a design example of the colors of color patches shown in FIG. 2A.

FIG. 2A is an enlarged fragmentary view of the print 24 in FIG. 1. As shown in FIG. 2A, the control strip 28 on a left-side marginal edge area of the print medium 22 comprises a plurality of identically shaped color patches 36a through 36i of different colors. At least nine color patches 36a through 36i are shown in the drawing. The color patches 36a through 36i are arrayed vertically without gaps therebetween along the direction in which the print medium 22 is transported.

FIG. 2B is a diagram showing a design example of the colors of the color patches 36a through 36i shown FIG. 2A. FIG. 2B shows reference values prescribed according to ISO12647-2. For example, the color patch 36a has reference values $L^*=93$, $a^*=0$, $b^*=-3$ with respect to an unprinted area (paper), and the color patch 36f has reference values $L^*=47$, $a^*=66$, $b^*=50$ with respect to a secondary color in M, Y (M+Y).

Preferably, color values are used as reference values that do not depend on the input/output apparatus (so-called device-independent color values). More specifically, a color system such as HSV (Hue-Saturation-Value), HLS (Hue-Lightness-Saturation), CIELAB, CIELUV, XYZ, or the like may be used as a color system for representing device-independent color values.

[Block Representation of Color Conversion Processing Apparatus 12]

Figure 3:
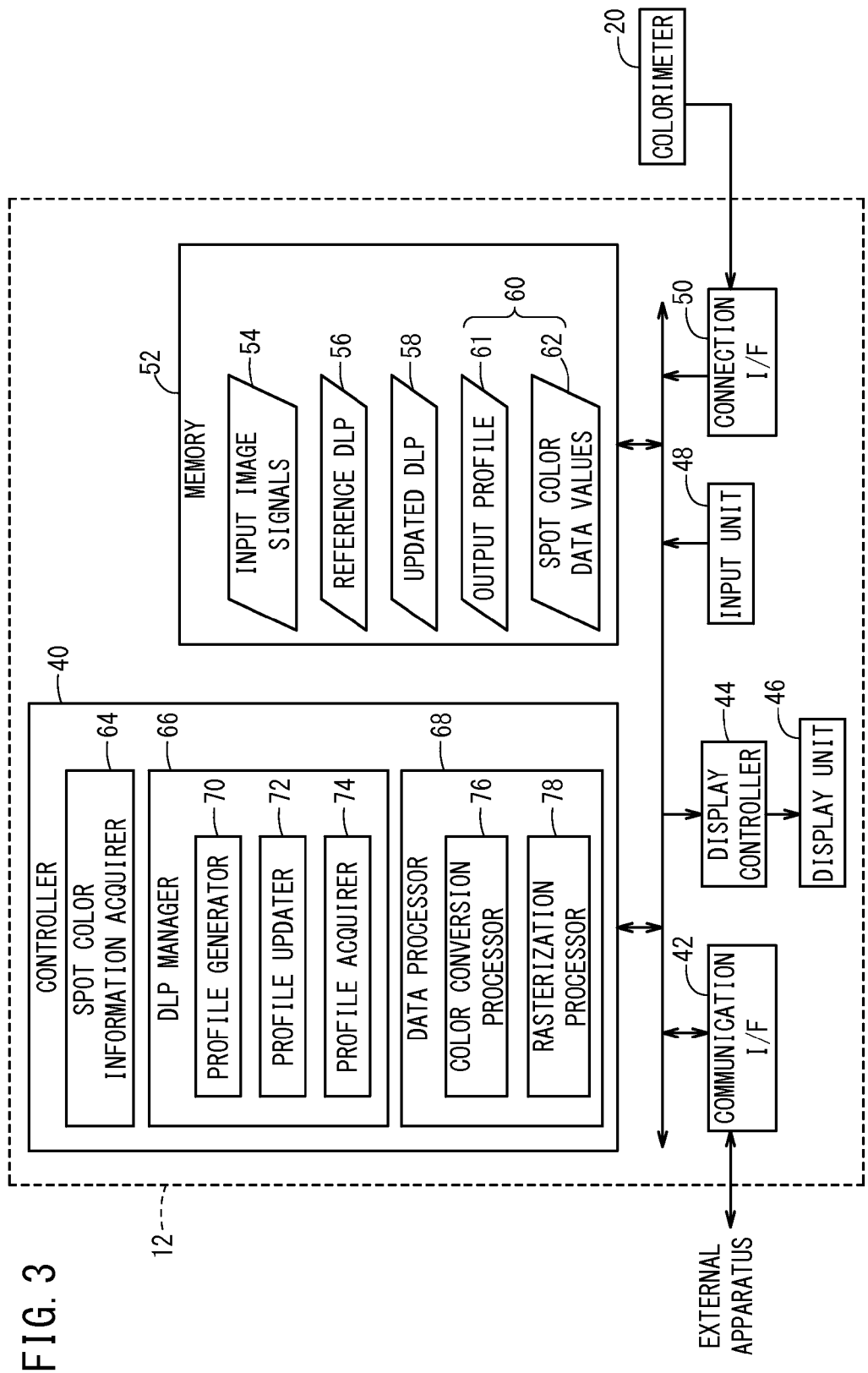
FIG. 3 is an electric block diagram of the color conversion processing apparatus shown in FIG. 1.

FIG. 3 is an electric block diagram of the color conversion processing apparatus 12 shown in FIG. 1. As shown in FIG. 3, the color conversion processing apparatus 12 comprises a computer, which includes a controller 40, a communication I/F 42, a display controller 44, a display unit 46, an input unit 48, a connection I/F 50, and a memory 52 (storage medium).

The communication I/F 42 is an interface (I/F) for sending electric signals to and receiving electric signals from an external apparatus. Via the communication I/F 42, the color conversion processing apparatus 12 can acquire various data such as input image signals 54, for example, from the database server 18 (FIG. 1), and can supply various data such as spot color information 60, for example, to the database server 18.

The display controller 44 comprises a control circuit for controlling the display unit 46 under the control of the controller 40. More specifically, in a case where the display controller 44 outputs a display control signal to the display unit 46 via a non-illustrated interface, the display unit 46 is energized to display various images. The input unit 48 comprises various input devices including a mouse, a trackball, a keyboard, a touch sensor, etc. The display function of the display unit 46 and the input function of the input unit 48 are combined into a user interface.

The connection I/F 50 is an interface for receiving colorimetric data from the colorimeter 20. Thus, the color conversion processing apparatus 12 can acquire colorimetric values of the control strip 28 (FIG. 2A) via the colorimeter 20.

The memory 52 stores programs and data, which are required for the controller 40 to control various components of the color conversion processing apparatus 12. As shown in FIG. 3, the memory 52 stores the input image signals 54, a reference DLP 56 (reference profile), an updated DLP 58 (updated profile), and spot color information 60. "DLP" stands for a device link profile representing a data file that includes a color conversion table for mapping from a device-dependent color space to a device-dependent color space. In FIG. 3, the spot color information 60 is composed of an output profile 61 and spot color data values 62.

The memory 52 may comprise a computer-readable non-transitory storage medium. In this case, the computer-readable storage medium is a portable medium such as a magnetooptical disk, a ROM, a CD-ROM, a flash memory, or other non-transitory computer-readable storage medium, or a storage device such as a hard disk that is incorporated in a computer system. The storage medium may hold programs dynamically, or may hold programs for a prescribed period of time.

The controller 40 comprises a processor such as a CPU (Central Processing Unit) or the like. The controller 40 reads and executes programs stored in the memory 52 in order to perform the functions of a spot color information acquirer 64, a DLP manager 66, and a data processor 68.

The spot color information acquirer 64 acquires the spot color information 60, which is capable of defining spot colors with color values depending on input/output apparatus (hereinafter referred to as "device-dependent color values"). The spot color information 60 may be a single piece of information (a device-dependent color value itself) or a combination of pieces of information (e.g., a device-dependent color value and a profile).

The DLP manager 66 generates and updates, registers, and deletes DLPs that are used in a color conversion process. More specifically, the DLP manager 66 has a profile generator 70 for generating various profiles, a profile updater 72 for updating DLPs as necessary, and a profile acquirer 74 for acquiring various profiles that are suitable for the color conversion process.

The data processor 68 performs data processing suitable for printing on the input image signals 54. More specifically, the data processor 68 has a color conversion processor 76 for carrying out the color conversion process using various profiles, and a rasterization processor 78 for converting a PDL (Page Description Language) format into a raster format.

[First Operation Sequence of Color Conversion Processing Apparatus 12]

The print production system 10 according to the present embodiment is configured as described above. A first operation sequence of the print production system 10 (in particular, the color conversion processing apparatus 12) will be described in detail below with reference to the flowchart shown in FIG. 4. The first operation sequence refers to various operations concerned with the management of profile data.

Figure 4:
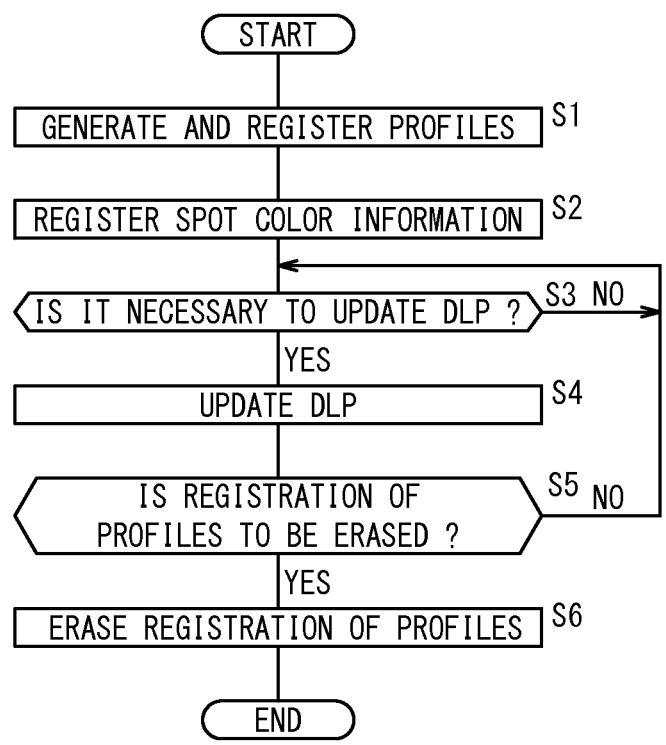
FIG. 4 is a flowchart of a first operation sequence in relation to management of profile data.

In step S1 of FIG. 4, the print production system 10 generates and registers profiles. A process of generating various profiles will be described below with reference to FIG. 5A.

As shown in FIG. 5A, the profile generator 70 generates an output profile 61 based on a first data set 80. The first data set 80 comprises color values regarding a color patch in a color chart, not shown. More specifically, the first data set 80 comprises device values 81 representing design values of colors of the color patch (device-dependent colors) and measured values 82 representing colorimetric values of the color patch (device-independent colors).

For generating the output profile 61, the profile generator 70 generates color conversion tables that are used for an "A2B conversion" and a "B2A conversion" according to a known process. The "A2B conversion" corresponds to a color conversion from a device-dependent color space (A) into a device-independent color space (B), whereas the "B2A conversion" corresponds to a color conversion from a device-independent color space (B) into a device-dependent color space (A).

After the profile generator 70 has read a target profile 84 corresponding to an "input profile" from the profile DB 32, the profile generator 70 couples the target profile 84 with the output profile 61, thereby generating a reference DLP 56. The reference DLP 56 includes a color conversion table that is used for an "A2A conversion". The "A2A conversion" corresponds to a color conversion from a device-dependent color space (A) into a device-dependent color space (A).

Next, after having received an instruction to register profiles, the print production system 10 performs a process of sending and receiving data. More specifically, the color conversion processing apparatus 12 sends communication data including the reference DLP 56 and the output profile 61 through the communication I/F 42 to the database server 18. After having received the communication data, the database server 18 adds and registers the reference DLP 56 and the output profile 61, which are included in the communication data, in the profile DB 32.

From the standpoint of enhancing color reproduction characteristics, it may be preferable occasionally to handle profiles on input and output sides integrally as one profile (DLP), rather than handling the profiles individually. According to the present embodiment, it is assumed that a DLP is used in a case where a color conversion process is carried out.

In step S2, the print production system 10 registers spot color information 60 by defining a spot color with device-dependent color values. According to the present embodiment, spot color data values 62, which represent device-independent color values (e.g., L*, a*, b* values) of a spot color, and an output profile 61, which is used in generating a reference DLP 56, are prepared as spot color information 60.

Next, after having received an instruction to register the spot color information 60, the print production system 10 performs a process of sending and receiving data. More specifically, the color conversion processing apparatus 12 sends communication data including the spot color information 60 (the spot color data values 62 and the output profile 61) through the communication I/F 42 to the database server 18. After having received the communication data, the database server 18 adds and registers the spot color data values 62, which are included in the communication data, in association with the output profile 61 in the spot color information DB 34.

In step S3, it is judged whether or not it is necessary to update the DLP (including the reference DLP 56). This judgment may be made either by one of the components of the print production system 10, or by the operator as a user of the print production system 10.

For example, the DLP manager 66 acquires colorimetric values of the control strip 28 on the print 24 via the colorimeter 20 or the colorimetric sensor 30, evaluates color reproduction characteristics according to prescribed standards, and judges whether or not the DLP needs to be updated. The DLP manager 66 may judge whether or not the DLP needs to be updated in response to a manual action performed by the operator on the input unit 48.

On condition it is judged that it is not necessary to update the DLP (step S3: NO), then step S3 is looped to continue managing and operating the DLP. On condition it is judged that it is necessary to update the DLP (step S3: YES), then the control proceeds to step S4.

In step S4, the print production system 10 updates the DLP, which was judged to require updating in step S3. A process of updating the DLP will be described below with reference to FIG. 5B.

As shown in FIG. 5B, the profile updater 72 updates the reference DLP 56 based on a second data set 90. The second data set 90 comprises color values in relation to the color patches 36a through 36i of the control strip 28 (FIG. 2A). More specifically, the second data set 90 comprises reference values 91 representing reference values of colors of the color patches 36a (device-independent colors), etc., and measured values 92 representing colorimetric values of the color patches 36a (device-independent colors), etc.

For updating the reference DLP 56, the profile updater 72 corrects the color conversion table that is used for the "A2A conversion". Thereafter, the corrected DLP (hereinafter referred to as an "updated DLP 58") can be used to compensate for a reduction in color reproduction accuracy (a deviation of the measured values 92 from the reference values 91), which is caused by time-dependent changes in the state of the printing apparatus 14.

As shown in FIG. 5B, the profile updater 72 corrects the reference DLP 56 and outputs the updated DLP 58. The example shown in FIG. 5B represents a data process flow of a first updating event. In second and subsequent updating events, the profile updater 72 corrects the updated DLP 58 and outputs a new updated DLP 58.

In step S5, it is judged whether or not the current registration of profiles should be erased. Similar to step S3, this judgment may be made either by one of the components of the print production system 10, or by the operator as a user of the print production system 10.

On condition it is judged that the current registration of profiles should not be erased (step S5: NO), then the control returns to step S3, and steps S3 through S5 are repeated successively. On condition it is judged that the current registration of profiles should be erased (step S5: YES), then the control proceeds to step S6.

In step S6, the print production system 10 erases the registration of profiles. More specifically, the color conversion processing apparatus 12 erases the reference DLP 56, the updated DLP 58, and the spot color information 60, which are stored in the memory 52. Alternatively, the color conversion processing apparatus 12 may erase the data registered in the profile DB 32 or the spot color information DB 34. At this time, the first operation sequence of the print production system 10 (in particular, the color conversion processing apparatus 12) is brought to an end.

[Second Operation Sequence of Color Conversion Processing Apparatus 12]

A second operation sequence of the print production system 10 (in particular, the color conversion processing apparatus 12) will be described in detail below with reference to the flowchart shown in FIG. 6. The second operation sequence refers to various operations concerned with a printing process, in particular a color conversion process, for printing the print 24.

In step S11, the color conversion processing apparatus 12 judges whether or not an instruction has been issued for starting the printing process. On condition there is no instruction (step S11: NO), then the color conversion processing apparatus 12 loops step S11 until it receives an instruction. On condition there is an instruction (step S11: YES), then the color conversion processing apparatus 12 acquires input image signals 54 that are used in the printing process. Control then proceeds to step S12.

In step S12, the spot color information acquirer 64 acquires spot color information 60, which is capable of defining a spot color with device-dependent color values. The spot color information acquirer 64 may acquire spot color information 60 related to the input image signals 54, or may download spot color information 60 from the spot color information DB 34, using ancillary information of the input image signals 54 as a clue.

In step S13, the profile acquirer 74 acquires various profiles that are used in the color conversion process. The profile acquirer 74 acquires DLPs that are suitable for the printing apparatus 14. More specifically, the profile acquirer 74 acquires a reference DLP 56 at a reference time at which the spot color is defined, and a reference DLP updated after the reference time (stated otherwise, an updated DLP 58).

In steps S14 through S17, the color conversion processor 76 obtains output image signals 100 by successively performing predetermined data processing steps. A specific example of the color conversion process will be described in detail below with reference to FIG. 7.

Figure 7:
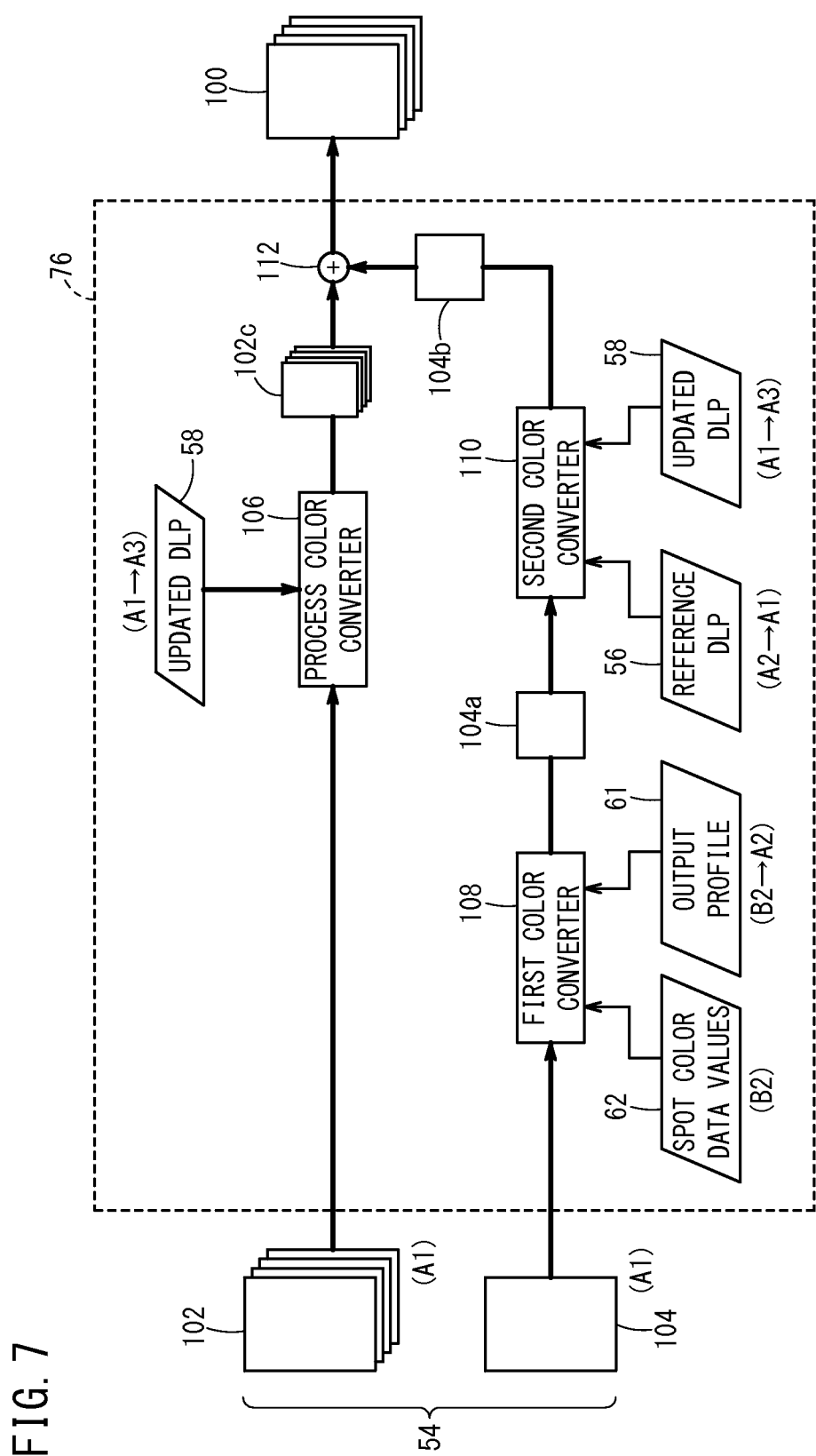
FIG. 7 is a detailed block diagram of a color conversion processor shown in FIG. 3.

FIG. 7 is a detailed block diagram of the color conversion processor 76 shown in FIG. 3. The color conversion processor 76 converts input image signals 54 into output image signals 100 using color conversion information including the profiles. The input image signals 54 are composed of image signals 102 of process color plates and an image signal 104 of a spot color plate. The output image signals 100 are composed of image signals of process color plates.

In FIG. 7, color reproduction characteristics represented by the image signals are denoted by symbols "A1", "A2", "A3", and "B2" for illustrative purposes. The symbols "A1", "A2", and "A3" represent device-dependent color spaces specified respectively by the target profile 84, the reference DLP 56, and the updated DLP 58. The symbol "B2" represents a device-independent color space specified by the reference DLP 56.

Figure 6:
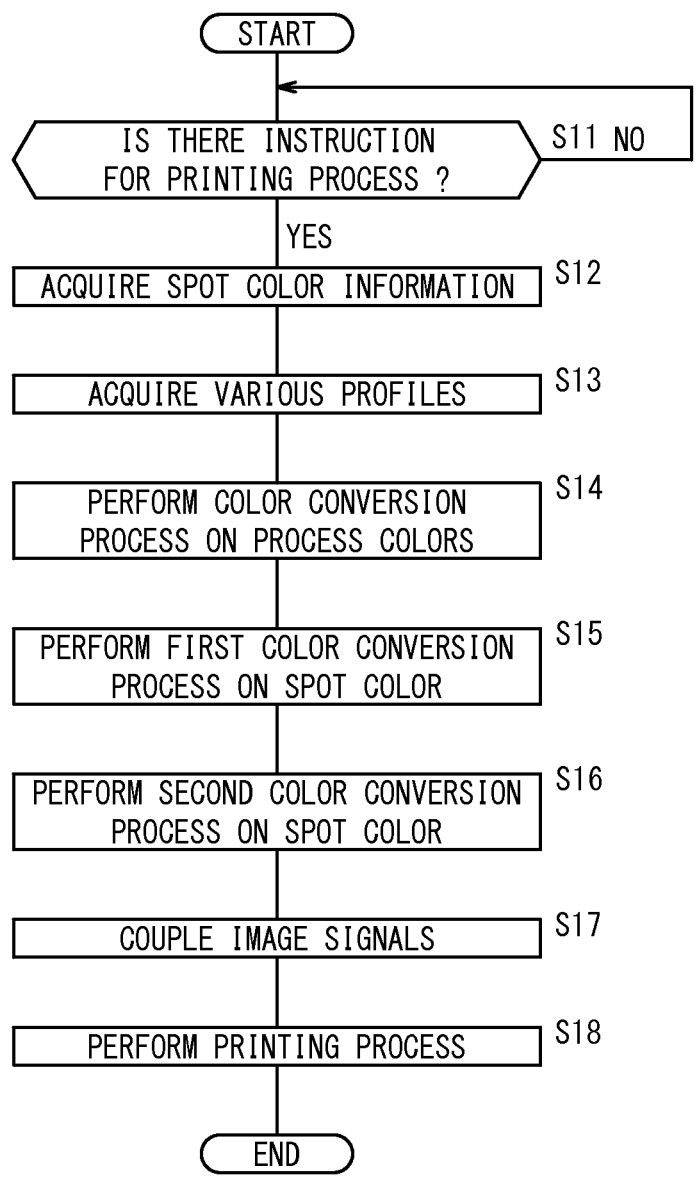
FIG. 6 is a flowchart of a second operation sequence in relation to a printing process.

In step S14 of FIG. 6, a process color converter 106 performs a color conversion process (A2A conversion) on the image signals 102 of the process color plates by having the updated DLP 58 act thereon. By performing the color conversion process, the process color converter 106 obtains image signals of process color plates (hereinafter referred to as "third image signals 102c"), which are suitable for the state (A3) of the printing apparatus 14 at the present time.

In step S15 of FIG. 6, a first color converter 108 performs a first color conversion process (A2A conversion) on the image signal 104 of the spot color plate using the spot color information 60. The first color conversion process comprises [1] an "A1→B2" conversion based on the spot color data values 62 and [2] a "B2→A2" conversion based on the output profile 61, which are successively coupled together. By performing the first color conversion process, the first color converter 108 obtains an image signal of a process color plate (hereinafter referred to as "first image signal 104a"), which is suitable for the state (A2) of the printing apparatus 14 at the reference time.

In step S16 of FIG. 6, a second color converter 110 performs a second color conversion process (A2A conversion) on the first image signal 104a of the process color plate, by having the reference DLP 56 and the updated DLP 58 act successively thereon. The second color conversion process comprises [1] an "A2→A1" conversion based on the reference DLP 56 and [2] an "A1→A3" conversion based on the updated DLP 58, which are successively coupled together. By performing the second color conversion process, the second color converter 110 obtains an image signal of a process color plate (hereinafter referred to as "second image signal 104b"), which is suitable for the state (A3) of the printing apparatus 14 at the present time.

In step S17 of FIG. 6, a signal adder 112 adds and couples the second image signal 104b, which were converted by the second color converter 110, to the third image signals 102c, which were converted by the process color converter 106. In this manner, the color conversion processor 76 obtains the output image signals 100.

In step S18, the printing process is carried out based on the output image signals 100, which were converted in color in step S17. Prior to the printing process, the rasterization processor 78 performs a rasterization process that is suitable for the printing apparatus 14 on the output image signals 100, so as to generate raster data, and supplies the generated raster data to the printing apparatus 14. Then, based on the raster data, the printing apparatus 14 produces a desired print 24.

At this time, the second operation sequence of the print production system 10 (in particular, the color conversion processing apparatus 12) is brought to an end. Consequently, the printing apparatus 14, which is incompatible with spot color printing, e.g., a proofer, is capable of realizing color reproduction characteristics that are suitable for the state of the printing apparatus 14 at the present time, in substantially the same fashion as an apparatus that is compatible with spot color printing.

Advantages of the Present Embodiment

As described above, the color conversion processing apparatus 12 according to the present embodiment converts input image signals 54, which are composed of image signals 102 of process color plates and an image signal 104 of a spot color plate, into output image signals 100 of process color plates.

The color conversion processing apparatus 12 includes the spot color information acquirer 64 for acquiring spot color information 60, which is capable of defining a spot color with device-dependent color values, the profile acquirer 74 for acquiring a reference DLP 56 at a reference time at which the spot color is defined, and an updated DLP 58, which is defined by the reference DLP 56 updated after the reference time, the first color converter 108 for converting an image signal 104 of a spot color plate into a first image signal 104*a* of a process color plate, using the spot color information 60, and the second color converter 110 for converting the first image signal 104*a* into a second image signal 104*b* of a process color plate by having the reference DLP 56 and the updated DLP 58 act successively thereon.

The first color conversion process, which uses the spot color information 60, is separate from the second color conversion process, which does not use the spot color information 60 but includes the reference DLP 56 and the updated DLP 58 that act successively on the first image signal 104*a*. Consequently, updated results of profiles can appropriately be reflected, even though the same spot color information 60 is used. Thus, the color reproduction accuracy of spot colors can be maintained while data management is easily performed on the spot color information 60.

SUPPLEMENTARY REMARKS

The present invention is not limited to the above embodiment, and the present embodiment can freely be changed or modified without departing from the scope of the invention.

According to the present embodiment, the spot color information acquirer 64 acquires as the spot color information 60 device-independent color values of a spot color (spot color data values 62) and the output profile 61 that is used for generating the reference DLP 56. However, the present invention is not limited to acquisition of the output profile 61 in this manner. For example, as the spot color information 60, the spot color information acquirer 64 may acquire device-dependent color values of a spot color (e.g., L*, a*, b* values).

What is claimed is:

1. A color conversion processing and printing apparatus for converting input image signals, which include image signals of process color plates and an image signal of a spot color plate, into output image signals of process color plates for printing an image, said apparatus comprising:
    a spot color information acquirer configured to acquire spot color information, which is capable of defining a spot color with device-dependent color values;
    a profile acquirer configured to acquire a reference profile representing a device link profile at a reference time at which the spot color is defined, and an updated profile, which is defined by the reference profile updated after the reference time;
    a first color converter configured to convert the image signal of the spot color plate into a first image signal of a process color plate, using the spot color information acquired by the spot color information acquirer;
    a second color converter configured to convert the first image signal, which has been converted by the first color converter, into a second image signal of a process color plate, by having the reference profile and the updated profile, which are acquired by the profile acquirer, act successively thereon; and
    a printer configured to output a color print using an amount of ink applied to an output medium, the amount of ink being based on the second image signal.

2. The color conversion processing apparatus according to claim 1, further comprising:
    a process color converter configured to convert the image signals of the process color plates into third image signals of process color plates, by having the updated profile act thereon; and
    a signal adder configured to add the second image signal, which has been converted by the second color converter, to the third image signals, which have been converted by the process color converter, in order to obtain the output image signals.

3. The color conversion processing apparatus according to claim 1, wherein the spot color information acquirer acquires as the spot color information device-independent color values of the spot color and an output profile which is used in generating the reference profile.

4. The color conversion processing apparatus according to claim 1, wherein the spot color information acquirer acquires as the spot color information device-dependent color values of the spot color.

5. A color conversion processing method for converting input image signals, which include image signals of process color plates and an image signal of a spot color plate, into output image signals of process color plates for printing a color image, the color conversion processing method comprising:
    using one or more computers to performs steps of:
    acquiring spot color information, which is capable of defining a spot color with device-dependent color values;
    acquiring a reference profile representing a device link profile at a reference time at which the spot color is defined, and an updated profile, which is defined by the reference profile updated after the reference time;
    converting the image signal of the spot color plate into a first image signal of a process color plate, using the acquired spot color information;
    converting the converted first image signal into a second image signal representative of color of a process color plate by having the acquired reference profile and the acquired updated profile act successively thereon; and
    printing a color output image using an amount of ink applied on an output medium, the amount of ink being based on the second image signal.

6. The method of claim 5 further comprising outputting the color output image using an ink amount corresponding to the second image signal representative of color of the process color plate, said ink amount being applied to a printing plate.

7. A non-transitory computer readable storage medium storing a color conversion processing program for converting input image signals, which include image signals of process color plates and an image signal of a spot color plate, into output image signals of process color plates for printing a color image, the color conversion processing program enabling a computer to perform the steps of:
- acquiring spot color information, which is capable of defining a spot color with device-dependent color values;
- acquiring a reference profile representing a device link profile at a reference time at which the spot color is defined, and an updated profile, which is defined by the reference profile updated after the reference time;
- converting the image signal of the spot color plate into a first image signal of a process color plate, using the acquired spot color information;
- converting the converted first image signal into a second image signal of a process color plate by having the acquired reference profile and the acquired updated profile act successively thereon; and
- printing a color output image using an amount of ink applied on an output medium, the amount of ink being based on the second image signal.

8. A color conversion processing apparatus for converting input image signals, which include image signals of process color plates and an image signal of a spot color plate, into output image signals of process color plates, comprising:
- a spot color information acquirer configured to acquire spot color information, which is capable of defining a spot color with device-dependent color values, the spot color information including
  - a spot color data value configured to represent a device-independent color value of the spot color, and
  - an output profile configured to be used in generating a reference profile representing a device link profile at a reference time at which the spot color is defined;
- a profile acquirer configured to acquire the reference profile, and an updated profile, which is defined by the reference profile updated after the reference time;
- a first color converter configured to convert the image signal of the spot color plate into a first image signal of a process color plate, having the spot color data value and the output profile acquired by the spot color information acquirer act successively; and
- a second color converter configured to convert the first image signal, which has been converted by the first color converter, into a second image signal of a process color plate, by performing a color conversion process that includes successively coupling a color conversion based on the reference profile which are acquired by the profile acquirer and a color conversion based on the acquired updated profile, the second image signal determining an amount of ink to be applied to an output medium.

9. A color conversion processing method for converting input image signals, which include image signals of process color plates and an image signal of a spot color plate, into output image signals of process color plates, the color conversion processing method enabling a computer to perform the steps of:
- acquiring spot color information, which is capable of defining a spot color with device-dependent color values, the spot color information including
  - a spot color data value configured to represent a device-independent color value of the spot color, and
  - an output profile configured to be used in generating a reference profile representing a device link profile at a reference time at which the spot color is defined;
- acquiring the reference profile, and an updated profile, which is defined by the reference profile updated after the reference time;
- converting the image signal of the spot color plate into a first image signal of a process color plate, having the acquired spot color data value and the output profile act successively; and
- converting the converted first image signal into a second image signal of a process color plate by performing a color conversion process that includes successively coupling a color conversion based on the acquired reference profile and a color conversion based on the acquired updated profile, the second image signal determining an amount of ink to be applied to an output medium.

10. A non-transitory storage medium storing a color conversion processing program for converting input image signals, which include image signals of process color plates and an image signal of a spot color plate, into output image signals of process color plates, the color conversion processing program enabling a computer to perform the steps of:
- acquiring spot color information, which is capable of defining a spot color with device-dependent color values, the spot color information including
  - a spot color data value configured to represent a device-independent color value of the spot color, and
  - an output profile configured to be used in generating a reference profile representing a device link profile at a reference time at which the spot color is defined;
- acquiring the reference profile, and an updated profile, which is defined by the reference profile updated after the reference time;
- converting the image signal of the spot color plate into a first image signal of a process color plate, having the acquired spot color data value and the output profile act successively; and
- converting the converted first image signal into a second image signal of a process color plate by performing a color conversion process that includes successively coupling a color conversion based the acquired reference profile and a color conversion based on the acquired updated profile, the second image signal determining an amount of ink to be applied to an output medium.

* * * * *